Feb. 24, 1970 H. E. CLARK 3,496,846

SCRIPTWRITER USING FIBER OPTIC BUNDLE

Filed Sept. 23, 1966 3 Sheets-Sheet 1

INVENTOR.
HAROLD E. CLARK
BY Ronald Zibelli
ATTORNEY

INVENTOR.
HAROLD E. CLARK
BY Ronald Zibelli
ATTORNEY

INVENTOR.
HAROLD E. CLARK
BY Ronald Zibelli
ATTORNEY

United States Patent Office 3,496,846

Patented Feb. 24, 1970

3,496,846

SCRIPTWRITER USING FIBER OPTIC BUNDLE

Harold E. Clark, Penfield, N.Y., assignor to Xerox Corporation, Rochester, N.Y., a corporation of New York

Filed Sept. 23, 1966, Ser. No. 581,541

Int. Cl. B41b *15/18*

U.S. Cl. 95—4.5 6 Claims

ABSTRACT OF THE DISCLOSURE

Apparatus comprising a stationary character transparency, a stationary light source to illuminate the characters and a fiber optic bundle allowing the character image to travel from the input terminal of the fiber optic bundle to the output terminal of the fiber optic bundle to expose a photosensitive recording surface adjacent the output terminal.

This invention relates, in general, to a scriptwriting system, and, more specifically, to a recording device which transposes characters from a key board-like stereotype to a recording surface.

Chinese and other ideographic languages differ from English in that entire ideas are expressed in terms of one character, whereas English utilizes an alphabet to build words and one or more words to express an idea. Alphabetized languages and particularly adaptable to typewriting systems since there are relatively few individual letters and the letters in the word or words used to compose an idea appear in sequence, each letter separately occupying an area of the line. Chinese characters, on the other hand, cannot be feasibly reconciled to the keyboard of a typewriter since a workable vocabulary would involve from 6,000 to 10,000 characters, each being unique and each requiring a separate key. Thus, a practical typewriting machine has never been developed for ideographic characters and much of the script is written by hand.

Attempts have been made to separate the various Chinese characters into elemental strokes and then use each stroke configuration in similar fashion as one uses letters in English. Although there are only 21 basic types of stroke in the sundry characters of Chinese, one runs into many problems while attempting to adapt these strokes to a typewriter keyboard. Since there are both long and short strokes, the number of basic strokes for a typewriter keyboard at least doubles, and, in addition, there is no general agreement when to use a long or short stroke even amoung Chinese writers.

A second disadvantage to adopting the stroke analysis to the typewriter keyboard is that an individual stroke may occupy one of several different positions relative to the total configuration of the character depending on what the particular character is to mean; that is, a vertical stroke may occur to the left or to the right or even through the middle of a horizontal stroke depending on the idea that is to be conveyed, and this degree of uncertainty in placing a stroke is quite contrary to the sequentially-placed markings that an ordinary typewriter requires.

A further difficulty with dividing the Chinese characters into strokes is that readers of Chinese do not normally comprehend easily the written symbol in terms of stroke elements. Thus, if the typewirter working on the stroke method does not place the various strokes making up a particular character in the proper position relative to the other strokes in the same character, the meaning of the character subsequently produced would not be immediately clear to the reader and would impede his speed of comprehension.

The problems of writing Chinese script are also prevalent in other languages, such as Japanese, and in texts where scientific symbols are utilized. A great range of scientific symbols is used in conjunction with text, and no feasible manner has been found by which a realistic number of symbols could be placed on a workable typewriter keyboard along with all the letters of the alphabet and various marks of punctuation. Many times such symbols are written into a typed text by hand at a great compromise to form and appearance.

A fair or elegant handwriting is very important to the reader's comprehension of scientific symbols and all ideographic languages such as Chinese and Japanese, but if the stroke method were used in conjunction with the keyboard to produce such characters, it would be hard to imagine how an elegant and symmetrical print could be produced.

Accordingly, it is an object of this invention to provide a novel scriptwriter which overcomes the deficiencies of the prior art devices as described above.

It is a further object of the present invention to provide a novel scriptwriter based on the use of stereotype characters to produce printed copy.

A third object of the invention is to provide a scriptwriter which employs a photosensitive recording surface.

Another object of this invention is to provide a scriptwriter whereby the optical images of the characters are transferred onto paper by means of an electrostatic imaging system.

A still further object of the invention is to provide a scriptwriter that produces any particular character nearly instantaneously.

A still further object of this invention is to provide a scriptwriter which can make a calligraphically-perfect character each and every time.

The objects of this invention are accomplished, generally speaking, by exposing the end of a flexible fiber bundle to an optic image generated by a transparency and light source located adjacent the character matrix, allowing the image to travel to the output end of the flexible fiber optic bundle which is located directly over a photosensitive recording surface, using it to expose the surface to the image, and developing the exposed recording surface as required.

The portion of the flexible fiber optic bundle directly over the recording surface is indexed automatically after exposure to each character so that the output terminal of the optic bundle is in the proper position in a line for the next character in sequence. When a line of characters has been completed the operator activates an electrical switch in order to advance the recording surface to the next line.

After the photosensitive recording member has been completely exposed to the script desired, it is put through any processing steps which may be required to form a permanent visible record.

Any suitable photosensitive recording technique may be used. Typical photosensitive recording techniques include xerography, siliver halide, diazo, vesicular, electrolytic electrophotography, etc. However, for exemplary purposes, the xerographic method is disclosed in greatest detail in connection with the drawings wherein.

Figure 1:
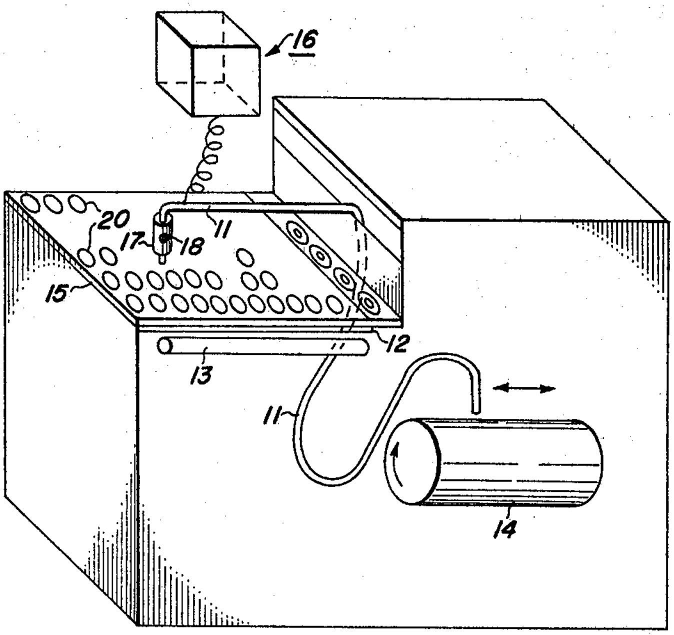
FIGURE 1 is a schematic isometric view of the apparatus.

Referring to FIGURE 1, the apparatus shows a length of flexible fiber optic bundle 11 around one end of which is placed a rigid supporting collar 17 and a switch 18. Switch 18, when activated, causes lamp 13 to illuminate transparency 12 upon which is found the stereotype for various Chinese characters, or any other various arbitrary letters, numbers, characters, punctuation and symbols. The image produced by illuminating the transparency travels through the flexible fiber optic bundle 11 onto the photosensitive recording surface 14.

Any suitable one of the photosensitive recording materials described above may be used as the photosensitive recording surface 14 and may, in fact, constitute the final surface upon which the image is recorded, or in the alternative, the image may be transferred from the photosensitive surface to some other surface for permanent retention. In the specific xerographic embodiment of the device described hereinafter the image is formed on a reusable photoconductive insulating xerographic drum and the image is transferred to a recording surface such as paper after it has been developed so that the recording surface itself may be resued.

The input end of the fiber optic bundle 11 is moved adjacent various character transparencies by the operator so as to compose the final image he desires to record while the output end of the fiber optic bundle is indexed along a line on the photosensitive recording surface 14. After the completion of one line, the operator then advances the photosensitive recording surface 14 to the next line before proceeding further with the message he is composing. Character indexing and line advance of the output end of the fiber optic bundle with respect to the recording surface is provided by electro-mechanical devices described in greater detail hereinafter; however, any suitable mechanism for performing this function may be employed in operating the device.

The spring-loaded counterbalance 16 returns the collar end of the optic bundle, when not in use, to a position above the transparency and also serves to counterbalance the collar end of the optic bundle when it is being placed over the characters by the operator.

Figure 2:
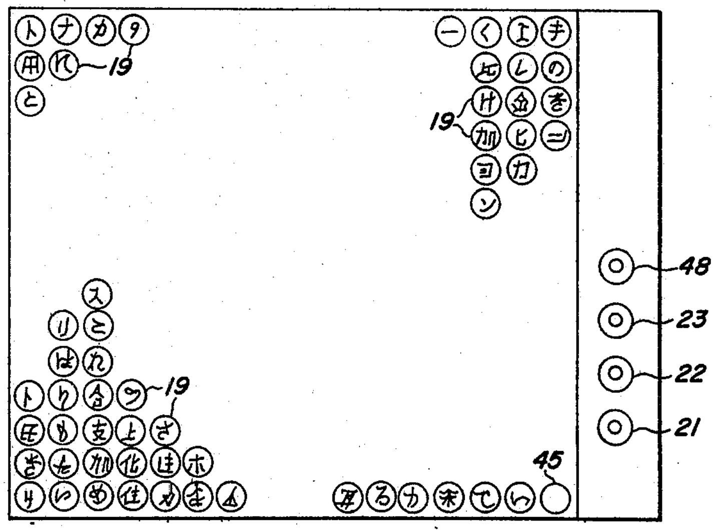
FIGURE 2 is a top view of the character matrix transparency and control panel.

Referring now to FIGURE 2, the lower part of the figure shows a transparency containing the configurations of a large number of characters. Each character 19 has a particular meaning and all characters may be grouped approximately in the same area of the transparency as other characters having a similar meaning. In location 45 is found a portion of the transparency being totally transulcent and bearing no symbol or character. This clear location is used for the "erasure" step. In one portion of FIGURE 2 are electrical switches 21 through 23; switch 21 spaces or positions the carriage 37 through a location where no character is supposed to appear; i.e., a blank space; switch 22 indexes the recording surface 14 to the next line and returns the output end of the flexible fiber optic bundle to its original starting position; and, switch 23 activates the developing cycle developing the image and transferring the developed electrostatic image on the recording drum 14 to paper.

Figure 3:
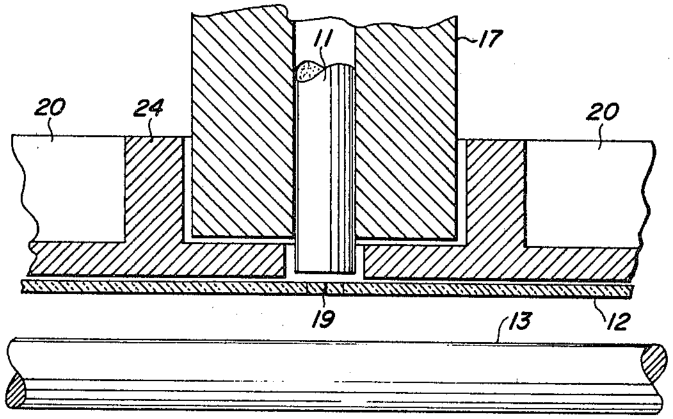
FIGURE 3 is a sectional side view of the relative positions of the flexible fiber optical bundle and the character matrix transparency mating during exposure.

As can best be seen in FIGURE 3, collar 17 can be seated in recesses 20 located in locating plate 24 above the character matrix transparency. These recesses guide the optic bundle directly over the particular character desired so that the operator is assured the optic bundle is in register with the transparency before activiting switch 18.

Figure 4:
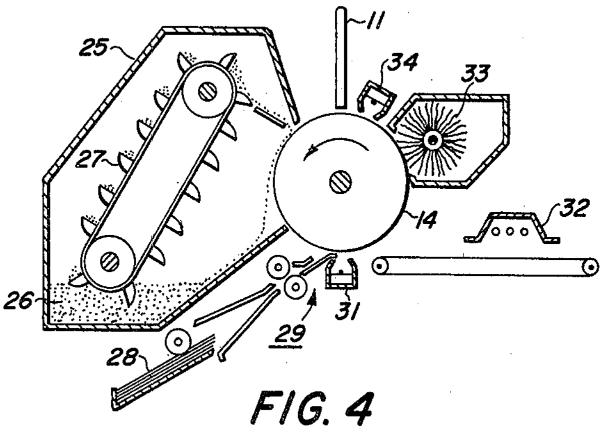
FIGURE 4 is a schematic diagram of the automatic xerographic apparatus.

FIGURE 4 illustrates a developing apparatus which is suitable for a xerographic photosensitive member. Prior to imaging, the recording surface 14 is charged positively by passing under a corona generating unit 34. The corona generating unit 34 is any suitable one of the known types used in xerographic reproducing devices and the polarity of charge which is applied to the photoconductive insulating layer depends upon the type of plate employed. As is well known to those skilled in the art, vitreous selenium xerographic plates operate more effectively when positively charged while xerographic plates made up of photosensitive zinc oxide dispersed in an insulating film-forming binder generally operate more effectively when negatively charged. In one exemplary embodiment, the corona generating unit consists of a fine wire spaced adjacent the surface of the photoconductive insulating layer of the xerographic plate with the wire being connected to a source of high voltage of the same polarity to which the xerographic plate is to be charged. By surrounding the wire with a conductive shield except in the area just opposite the xerographic plate, corona discharge from the wire is directed to the surface of the xerographic plate. Reference is made to U.S. Patent 2,777,957 to Walkup for a more detailed description of a corona charging unit suitable for use in this type of application.

After the operator selects the character or symbol and activates button 18, the xerographic recording surface is exposed to the image pattern issuing from the flexible fiber optic bundle 11. The light areas of the image dissipate the charge on the recording surface 14 while the charge is retained in the dark areas so that a latent electrostatic image remains on the recording surface after exposure.

The xerographic recording surface 14 is made up of a photoconductive insulating layer overlying a conductive backing. The insulating layer is of any suitable material such as vitreous selenium, known organic photoconductors or particulate photoconductive materials such as zinc oxide, cadium sulfide or lead oxide, dispersed in insulating binders. The conductive backing is of a material having sufficient electrical conductivity for the charging and sensitization of the xerographic recording surface and to accommodate the release of electrical charge upon exposure of the recording surface.

Subsequent to the complete exposure desired of recording surface 14 and upon signal from button 23, the development cycle is begun. The electrostatic image first passes a cascade unit which includes an outer container or cover 25 with a trough at its bottom containing a supply of developing material 26. This developing material is picked up from the bottom of container 25 and dumped or cascaded over the surface of the xerographic recording surface by a number of buckets 27 on an endless driven conveyor belt. This development technique utilizes a two-element development mixture including finely divided, colored marking particles or toner and grossly larger carrier beads. When the carrier beads with negatively charged toner particles clinging to them are cascaded over the xerographic recording surface, the positive electrostatic field from the latent electrostatic charge pattern on the plate pulls negatively charged toner particles off the carrier beads serving to develop the image.

One drawback to the development method described when used in conjunction with ordinary transparencies is the unexposed or background areas remain charged and attract toner particles thereby resulting in a negative. In order to avoid black background, a preferred technique is reversal imaging and development. A reversal transparency, where the symbol is translucent and the background is opaque, is used with reversal development. Since toner adheres to portions of the recording surface where the charge has been dissipated with this type of procedure, a conventional positive image is produced.

By using a reversal transparency, light shines on the charged photoconductor only in areas corresponding to the character to be reproduced while all background areas are unexposed and remain charged along with spaces between lines and between paragraphs and blank headings. After the exposure is complete and the whole message has been transferred to the photoconductive surface, a reversal developer which is charged to the same polarity as the polarity of charge originally applied to the photoconductive insulating layer of the xerographic plate is used to develop the image. This toner is then repelled from the charged background areas and deposits out on the uncharged areas. Thus, for example, with a positively charged xerographic plate and uncharged image areas, a positive xerographic developer would deposit out in the uncharged areas of the plate during development since these appear to be relatively more negative than the positively charged background areas. Reference is made to U.S. Patent 2,573,881 which describes this reversal development procedure in greater detail.

As the recording surface 14 revolves through the developing cycle, sheets of paper 28 are automatically fed onto the recording surface 14 through roller and guide assembly 29. Corona generating unit 31 applies charge to the back of the paper in polarity opposite to that of the toner particles. This charge on the paper pulls the toner particles away from the recording surface 14 onto the paper.

After transfer of the toner image to the paper, the paper is separated from the drum and moves beneath a fixing unit 32 which serves to fuse or permanently fix the toner image to the paper. A resistance heater may be used for this purpose, as shown, however, other techniques may be used in fusing such as the subjection of the toner image to a solvent vapor or spraying the toner image with an overcoating. Before recharging the recording surface with the corona generating unit 34, it is wiped clean of any remaining toner particles by brush 33.

In addition to xerography, there are other equivalent and alternative photosensitive systems that are readily adaptable to the disclosed scriptwriter. One alternative is a purely photographic system located at the output end of the optic bundle whereby the image delivered by the optic bundle is directed onto unexposed film. After exposure the film is developed in a continuous process and printed onto photographic paper. Here again, reversal photographic techniques commonly used in photography may be employed in order to produce either a positive or a negative of the desired image.

Figure 5:
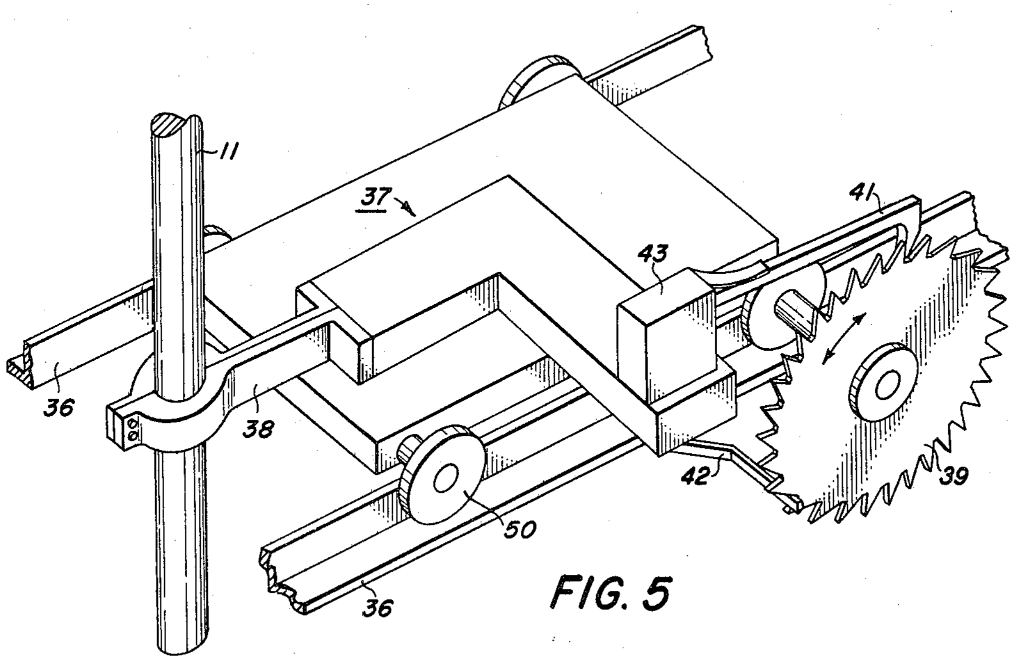
FIGURE 5 is a perspective view of the carriage which supports the output end of the flexible fiber optic bundle above the recording surface, and the indexing mechanism which moves the carriage transversely along the recording surface.

Referring now to FIGURE 5, a carriage 37, supported by wheels 50 running in tracks 36, guides the transverse travel of the output end of the flexible fiber optic bundle 11 connected to it by member 38. The bundle is indexed one space at a time across the recording surface either automatically; to wit, some short interval of time after button 18 signals, or by the signal of button 21. In both cases the ratchet 39 and pawl 41 device insures steady, uniform indexing of the carriage. An oscillating solenoid (not shown) in mechanism 43 drives pawl 41 which in turn rotates ratchet 39 thereby causing carriage 37 to advance to the point for exposing the next character. Stop 42 prevents the ratchet from revolving in a clockwise direction while indexing and during exposure of the recording surface.

Upon signal from switch 22, pawl 41 and stop 42 are brought away from the axis of ratchet 39 by a cam (not shown) in mechanism 43 and permit the ratchet wheel to freely turn in a clockwise direction bringing the output terminal of the flexible fiber optic bundle back to the beginning of a line. The carriage is returned in this manner by a motor (not shown) geared to the axle running through the ratchet wheel and respective wheels of the carriage.

Figure 6:
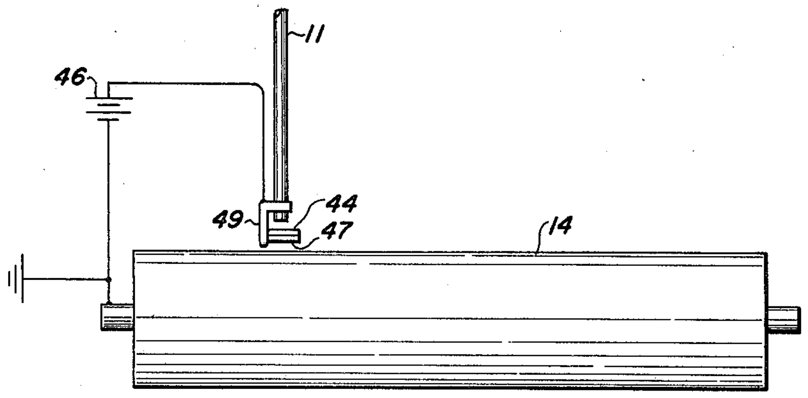
FIGURE 6 is a schematic diagram of the erasing apparatus.

As seen in FIGURE 6, between the output terminal of the flexible fiber optic bundle 11 and the xerographic drum 14 is a transparent electrode that may be utilized for "erasing" an area of the drum where an improper symbol has been imaged. The "erasure" step, commenced by pushing button 48, is accomplished by recharging the xerographic drum only in the area where the improper symbol has been placed. A transparent electrode of the "NESA" type is used for this purpose comprising a piece of glass 44 coated with transparent tin oxide 47. (NESA is a trademark of Pittsburgh Plate Glass Company.) The transparent electrode is only large enough to cover the area of one symbol on the drum and is joined to the output terminal of the optic bundle 11 by bracket 49.

Prior to activating switch 48, collar 17 is placed in register with a special recess for "erasure" 45 so that a ray of light bearing no symbol configuration can be translated through optic bundle 11 onto the drum.

When electrical power source 46 is initially activated, the area of drum 14 to be "erased" is flooded with light from the optic bundle to remove any trace of the latent electrostatic image of the erroneous symbol. For a period of time following light exposure, a potential is retained on the electrode thereby causing the "erased" area of the recording surface to be uniformly recharged by induction.

Since switch 18 automatically indexes the output terminal of the flexible fiber optic bundle after a latent image is placed on drum 11, prior to activating switch 48 to accomplish "erasure" a mechanism (not shown) similar to ratchet 39 and pawl 41 returns the output terminal to the preceding space where the erroneous symbol is located.

In addition to the procedure outlined above, many other modifications and/or additions to this system will be readily apparent to those skilled in the art upon reading this disclosure, and these are intended to be encompassed within the spirit of the invention.

Herein is claimed:

1. Apparatus comprising a stationary transparency having a plurality of symbols thereon, a stationary light source adjacent said transparency positioned to illuminate said symbols, a fiber optic bundle having an input terminal corresponding in size to an individual symbol located on the opposite side of said transparency from said light source, said input terminal laterally relocatable from a position adjacent one symbol to a position adjacent a different symbol, said optic bundle having an output terminal, photosensitive recording means adjacent said output terminal of said optic bundle, said output terminal laterally relocatable to successive positions adjacent said recording means, means to locate said input terminal precisely adjacent said symbols, and means to advance said output terminal to successive positions adjacent said recording means after each symbol is exposed, wherein said means to advance said output terminal adjacent said recording means includes a carriage supporting said flexible fiber optic bundle near its output terminal, said advancing means comprising a ratchet on said carriage connected to drive said carriage, a pawl positioned to rotate said ratchet, pawl operating means and control means connected to actuate said pawl operating means at the completion of the exposure of each symbol.

2. Apparatus comprising a stationary transparency having a plurality of symbols thereon, a stationary light source adjacent said transparency positioned to illuminate said symbols, a fiber optic bundle having an input terminal corresponding in size to an individual symbol located on the opposite side of said transparency from said light source, said input terminal laterally relocatable from a position adjacent one symbol to a position adjacent a different symbol, said optic bundle having an output terminal, photosensitive recording means adjacent said output terminal of said optic bundle, where the photosensitive recording means comprises a xerographic plate and further including means to charge said plate, said output terminal laterally relocatable to successive positions adjacent said recording means, means to locate said input terminal precisely adjacent said symbols, means to advance said output terminal to successive positions adjacent said recording means after each symbol is exposed and further including an erasing apparatus comprising a transparent electrode placed in the optical path of the image output from the output terminal, between the output terminal of said optic bundle and said xerographic plate, means to apply a voltage difference between said electrode and said plate, and means to expose said plate to light in the area to be recharged.

3. Apparatus comprising a stationary transparency having a plurality of symbols thereon, a stationary light source adjacent said transparency positioned to illuminate said symbols, a fiber optic bundle having an input terminal corresponding in size to an individual symbol located on the opposite side of said transparency from said light source, said input terminal laterally relocatable from a position adjacent one symbol to a position adjacent a different symbol, said optic bundle having an output terminal, photosensitive recording means adjacent said output terminal of said optic bundle, where the photosensitive recording means comprises a xerographic plate and further including means to charge said plate, said output terminal laterally relocatable to successive positions adjacent said recording means, means to locate said input terminal precisely adjacent said symbols, means to advance said output terminal to successive positions adjacent said recording means after each symbol is exposed wherein said transparency is a reversal transparency having translucent symbols and opaque background, and further including in combination adjacent said xerographic plate, reversal xerographic developing means for depositing electroscopic marking material in areas on said xerographic plate which have been exposed to light which has passed through said reversal transparency, said material having a charge of the same polarity as that applied to said plate by said charging means.

4. Apparatus according to claim 2 wherein said means to expose said plate to light in the area to be recharged includes a totally transparent symbol portion of said transparency.

5. An apparatus according to claim 3 wherein said means to locate said input terminal precisely adjacent a symbol comprises a collar enclosing said optic bundle near its input end, and a locating plate immediately adjacent said transparency on the side opposite said light source, said plate containing recesses which mate with said collar of said optic bundle.

6. The apparatus in claim 3 further including a spring biasing means connected adjacent the input terminal portion of said fiber optic bundle tending to yieldably urge said portion to a position above said transparency.

References Cited

UNITED STATES PATENTS

| | | | |
|---|---|---|---|
| 1,149,490 | 8/1915 | Bagge | 95—4.5 |
| 1,751,584 | 3/1930 | Hansell | 178—7 |
| 2,950,800 | 8/1960 | Caldwell | 95—4.5 X |
| 3,006,259 | 10/1961 | Blakely | 95—4.5 |
| 3,016,785 | 1/1962 | Kapany | 88—24 X |

JOHN M. HORAN, Primary Examiner

U.S. Cl. X.R.

178—7